(12) United States Patent
Giffen

(10) Patent No.: US 10,180,246 B2
(45) Date of Patent: Jan. 15, 2019

(54) LED SEARCHLIGHT AND METHOD

(71) Applicant: HONEYWELL INTERNATIONAL INC., Morris Plains, NJ (US)

(72) Inventor: Craig Giffen, Hilliard, OH (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 21 days.

(21) Appl. No.: 15/339,134

(22) Filed: Oct. 31, 2016

(65) Prior Publication Data

US 2018/0119938 A1    May 3, 2018

(51) Int. Cl.

| | |
|---|---|
| F21V 29/503 | (2015.01) |
| F21V 29/508 | (2015.01) |
| F21V 29/76 | (2015.01) |
| F21S 8/00 | (2006.01) |
| B60Q 1/24 | (2006.01) |
| B64D 47/02 | (2006.01) |
| F21V 29/71 | (2015.01) |
| F21V 29/83 | (2015.01) |
| F21W 131/406 | (2006.01) |

(52) U.S. Cl.
CPC .............. *F21V 29/503* (2015.01); *B60Q 1/24* (2013.01); *B60Q 1/245* (2013.01); *B64D 47/02* (2013.01); *F21S 8/003* (2013.01); *F21V 29/508* (2015.01); *F21V 29/71* (2015.01); *F21V 29/717* (2015.01); *F21V 29/767* (2015.01); *F21V 29/83* (2015.01); *B64D 2203/00* (2013.01); *F21W 2131/406* (2013.01)

(58) Field of Classification Search
CPC ..... F21V 29/503; F21V 29/508; F21V 29/767

USPC ......................................................... 362/235
See application file for complete search history.

(56) References Cited

U.S. PATENT DOCUMENTS

| | | | |
|---|---|---|---|
| 5,695,272 A | 12/1997 | Snyder et al. | |
| 7,434,964 B1 * | 10/2008 | Zheng .................. | F21V 29/006 362/218 |
| 7,518,133 B2 | 4/2009 | Giffen et al. | |
| 7,744,250 B2 | 6/2010 | Lee et al. | |

(Continued)

FOREIGN PATENT DOCUMENTS

| | | |
|---|---|---|
| EP | 1918204 A1 | 5/2008 |
| EP | 2743566 A1 | 6/2014 |

OTHER PUBLICATIONS

Extended EP Search Report for Application No. 17198163.2 dated Feb. 21, 2018.

*Primary Examiner* — Bryon T Gyllstrom
(74) *Attorney, Agent, or Firm* — Lorenz & Kopf, LLP

(57) ABSTRACT

A searchlight assembly has a first housing portion and a second housing portion, wherein each of the first housing portion and the second housing portion has operably secured to form an enclosed space: a heat sink, a reflector and a lens. The first housing portion and the second housing portion being are joined to form a housing assembly. The first housing portion heat sink and the second housing portion heat sink are disposed adjacent to one another and form a cooling medium flow path there between, and the heat sink elements of each heat sink thermally communicate with the flow path. A first LED is directly thermally coupled to the heat sink within in the first housing portion enclosed space and a second LED is directly thermally coupled to the heat sink within the second housing portion enclosed space.

18 Claims, 3 Drawing Sheets

(56) References Cited

U.S. PATENT DOCUMENTS

| | | | |
|---|---|---|---|
| 7,824,056 B2* | 11/2010 | Madireddi | A47F 3/001 362/125 |
| 8,089,085 B2 | 1/2012 | Shi | |
| 8,220,977 B2* | 7/2012 | Fugerer | F21K 9/00 362/373 |
| 8,414,160 B2* | 4/2013 | Sun | F21K 9/90 313/46 |
| 8,680,754 B2* | 3/2014 | Premysler | F21V 29/402 313/46 |
| 8,820,972 B2* | 9/2014 | Mollnow | F21S 10/02 362/294 |
| 2002/0075679 A1 | 6/2002 | Machi et al. | |
| 2003/0086251 A1 | 5/2003 | Hamilton et al. | |
| 2005/0265019 A1* | 12/2005 | Sommers | A47F 3/001 362/217.16 |
| 2007/0230184 A1* | 10/2007 | Shuy | F21K 9/00 362/294 |
| 2007/0279862 A1 | 12/2007 | Li | |
| 2008/0316755 A1* | 12/2008 | Zheng | F21V 29/004 362/373 |
| 2011/0089830 A1 | 4/2011 | Pickard et al. | |
| 2011/0089838 A1* | 4/2011 | Pickard | F21V 29/767 315/113 |
| 2011/0156584 A1* | 6/2011 | Kim | F21K 9/00 315/32 |
| 2013/0176724 A1* | 7/2013 | Yang | F21V 3/02 362/231 |
| 2014/0177224 A1 | 6/2014 | Tsai | |

* cited by examiner

LED SEARCHLIGHT AND METHOD

TECHNICAL FIELD

The technical field generally relates to search lights as are often found on aircraft and other search and rescue vehicles, and in particular, to a LED-based searchlight having a cooling efficient housing and heat sink structure and a method of cooling a searchlight.

BACKGROUND

Searchlights are frequently used on search and rescue vehicles including search and rescue aircraft, such as helicopters, to illuminate areas of interest to the aircraft pilot and/or crew. There are many searchlight designs, including halogen/incandescent tungsten filament designs. Within the weight and space limitations of an aircraft, these designs will often include multiple illumination sources adjacent a reflector and disposed within a housing covered with a glass or plastic lens.

An application where high power density light emitting diodes (LEDs) might provide a good design solution is searchlights. LED technology permits ever brighter constructions than existing incandescent technologies. Furthermore, the power or light output of an LED may be increased by increasing the die size. This allows still brighter LED arrays with fewer LED elements. Increasing die size to increase light output, however, increases the power density of the LED, which also consolidates heat generation and complicates cooling requirements.

Accordingly, it is desirable to provide a searchlight construction using LEDs as a light source with comparable or superior light emitting capability to halogen/incandescent tungsten filament designs, and efficient cooling in all operating environments. Other desirable features and characteristics of the herein described embodiments will become apparent from the subsequent detailed description and the appended claims, taken in conjunction with the accompanying drawings and the foregoing technical field and background.

SUMMARY

A searchlight assembly has a first housing portion and a second housing portion, wherein each of the first housing portion and the second housing portion has operably secured to form a reflector cavity, a heat sink, a reflector and a lens. The first housing portion and the second housing portion are joined to form a housing structure. The first housing portion heat sink and the second housing portion heat sink are disposed adjacent to one another and form a cooling medium flow path there between, and the heat sink elements of each heat sink thermally communicate with the flow path. A first LED is directly thermally coupled to the heat sink within the first housing portion reflector cavity and a second LED is directly thermally coupled to the heat sink within the second housing portion reflector cavity.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
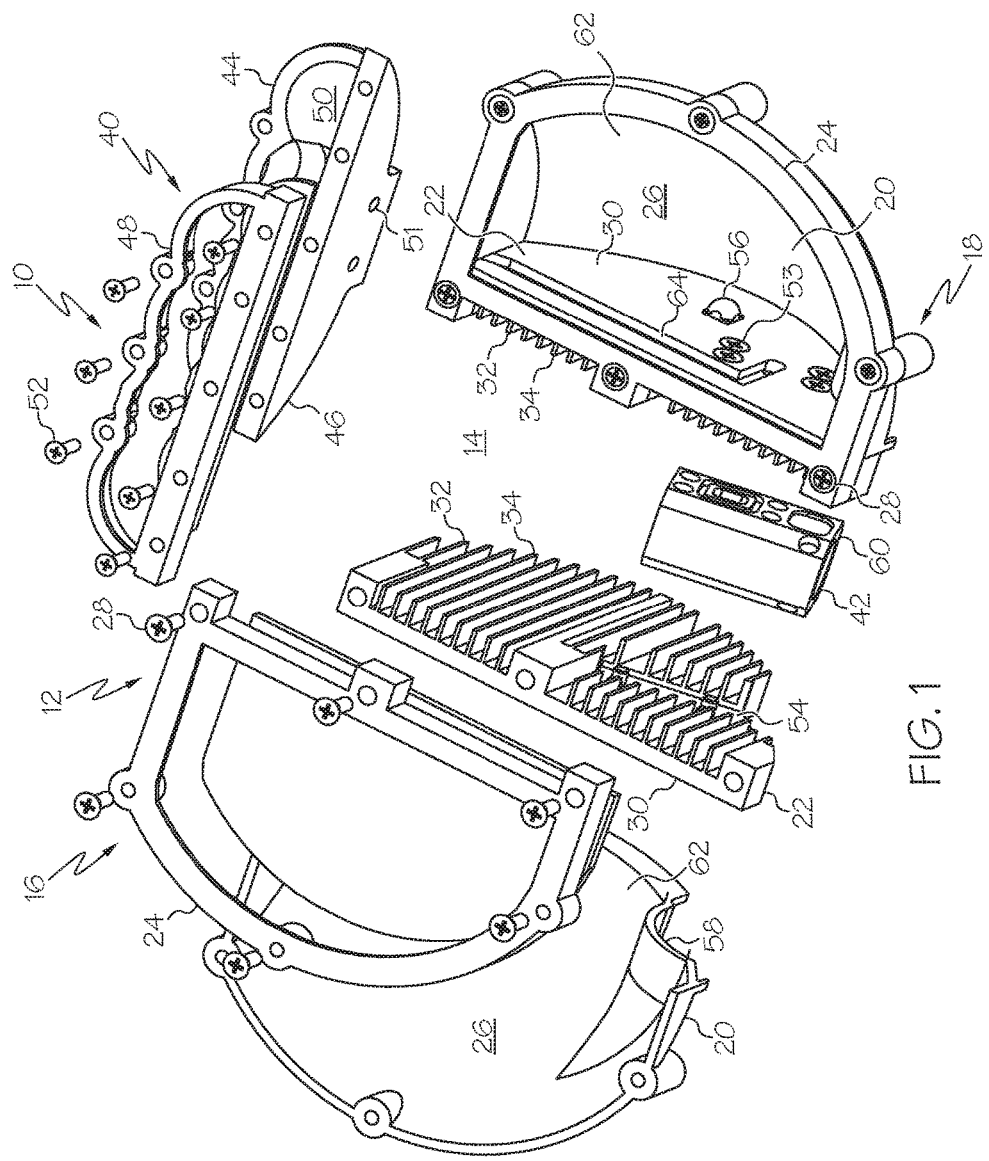
FIG. 1 is an expanded assembly view of a searchlight in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the terms "system" or "module" may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

Embodiments a searchlight and method of forming the same may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment may employ various combinations of electrical components, e.g., sensors, integrated circuit components, memory elements, digital signal processing elements, logic elements, look-up tables, or the like, which may carry out a variety of functions under the control of one or more microprocessors or other control devices. In addition, those skilled in the art will appreciate that embodiments may be practiced in conjunction with any number of mechanical and/or electronic systems, and that the systems described herein are merely exemplary embodiments.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

An LED based searchlight in accordance with the herein described embodiments incorporates an LED device directly attached to a heat sink with no intermediate metal core or glass-reinforced epoxy laminate circuit card. A searchlight according to the herein described embodiments further uses housing portions of the searchlight for additional heat dissipation. The searchlight housing is uniquely formed to expose a heat sink and housing structure to a flow of cooling medium.

Figure 2:
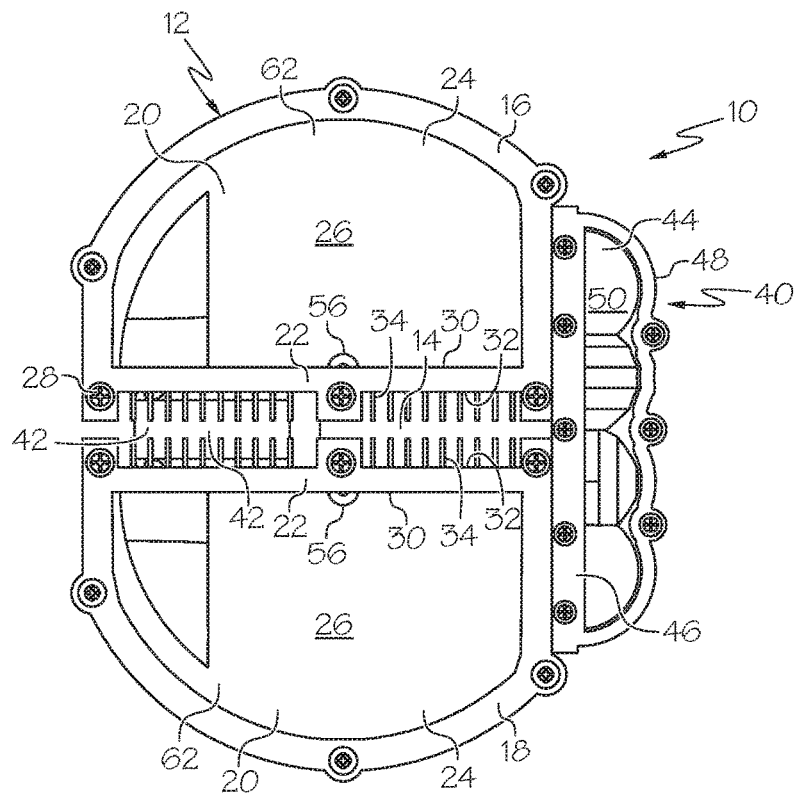
FIG. 2 is a front view of the searchlight depicted in FIG. 1.
Figure 3:
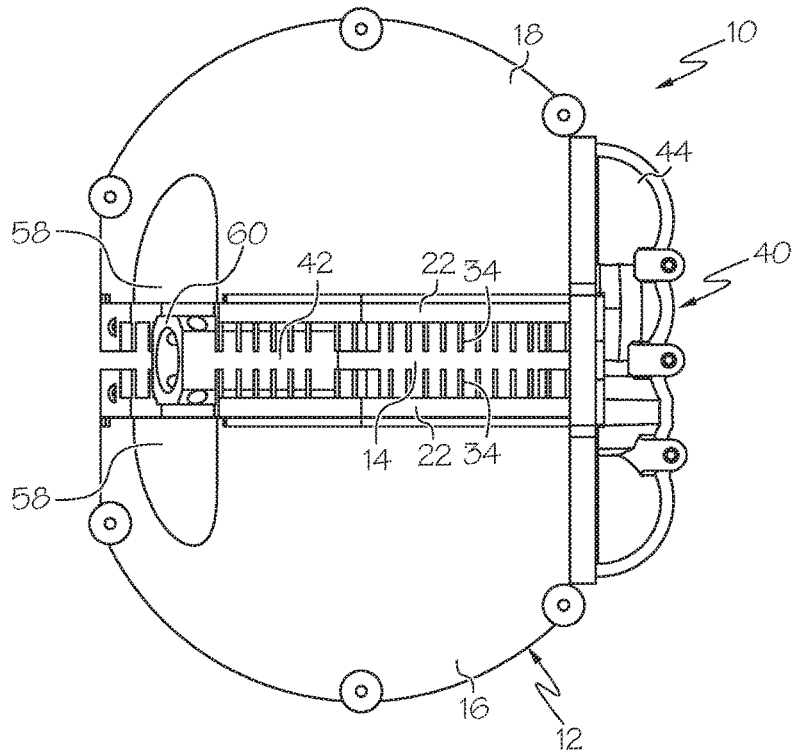
FIG. 3 is a rear view of the searchlight depicted in FIG. 1.
Figure 4:
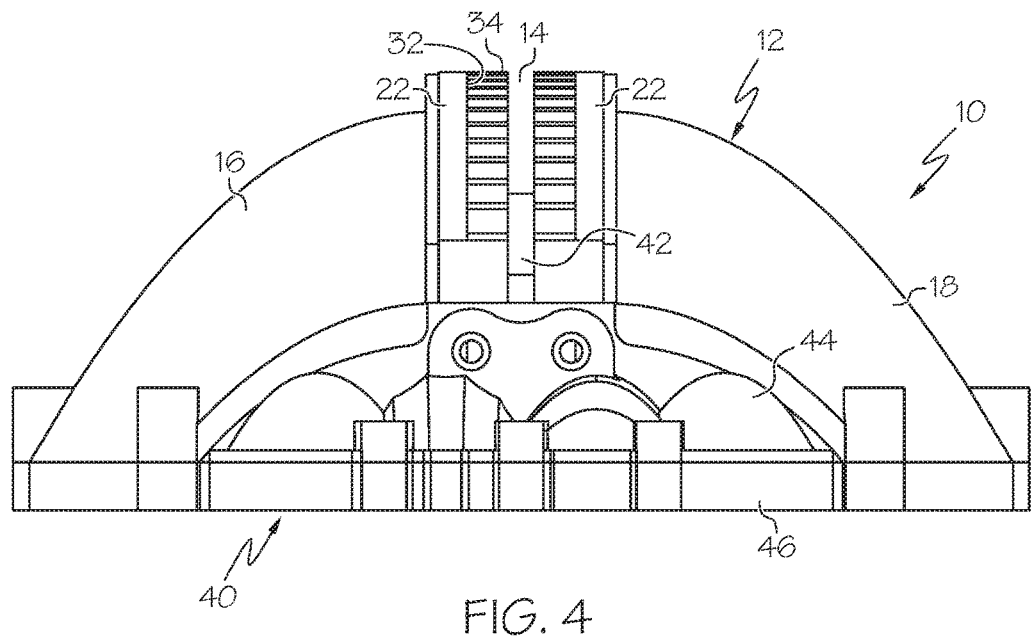
FIG. 4 is a top view of the searchlight depicted in FIG. 1.
Figure 5:
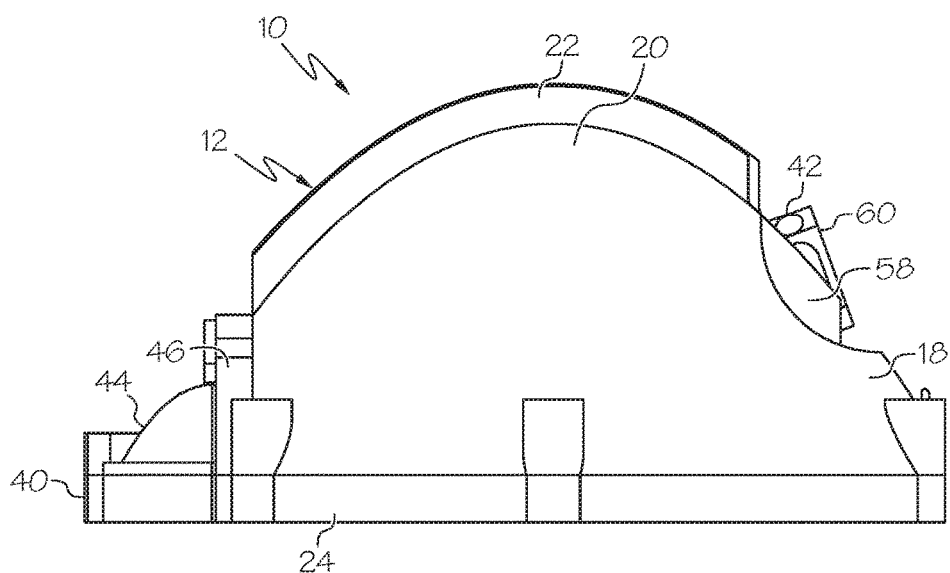
FIG. 5 is a left side view of the searchlight depicted in FIG. 1.

Referring to FIGS. 1-5, a searchlight 10 includes a housing structure 12 including a cooling medium flow path 14. The housing structure 12 includes a first housing section 16 and a second housing section 18. It will be appreciated that in accordance with the herein described embodiments, the first housing section 16 and the second housing section 18 are symmetric to each other. The following discussion of the first housing section 16 is exemplary, and it will be understood that the second housing section 18 is generally identical but not symmetric. Like reference numerals are used to identify like, symmetrical elements between the first and second housing sections 16 and 18.

The first housing section 16 includes a reflector 20, a heat sink 22 and a lens 24. The reflector 20 and the heat sink 22 are operably joined to form a reflector cavity 26. The reflector 20 and the heat sink 22 may be operably joined by bonding, welding, fastening and/or the like. The lens 24 is secured to the reflector 20 and the heat sink 22 by fasteners (one of which is indicated as fastener 28), although the lens could be otherwise secured to the reflector 20 and the heat sink 22. Removable fastening of the lens 24 permits removal of the lens 24 for servicing of components disposed within the reflector cavity 26. The joining of the reflector 20, the heat sink 22 and the lens 24 is accomplished in a way to ensure the reflector cavity is weather-tight, as it is intended that the searchlight 10 will be used in all weather conditions.

The heat sink 22 may be made of a suitable low thermal resistance material, such as aluminum, aluminum alloys, metal, metal alloys, thermally conductive polymers and the like. The heat sink 22 has a cavity side surface 30 and a fin side surface 32. The cavity side surface 30 may be made reflective by polishing, by application of a reflective coating or by any suitable method. The fin side surface 32 is formed to include a plurality of heat dissipating elements, such as cooling fins 34, or other suitable structures that enhance the dissipation of heat from the heat sink 22 under the flow of a cooling media. As depicted, in the housing structure 12, the cooling fins advantageously extend into the cooling medium flow path 14.

The first housing section 16 and the second housing section 18 are joined by a third housing section 40 and by a wiring/circuit block 42. The third housing section 40 is of similar construction as the first and second housing sections 16 and 18, and includes a reflector 44, a heat sink 46 and a lens 48 enclosing a reflector cavity 50 and secured by threaded fastener (one of which is indicated as fastener 52). The heat sink 46 suitably mechanically joins the first housing section 16 and the second housing section 18 such as engaging the respective heat sinks 22 by suitable fasteners (not depicted) extending through apertures 51.

A circuit/wiring block 42 is disposed between and secures to the heat sinks 22 and 32. In this regard, portions of the fins 34 may be removed forming a recess 54 into which the circuit/wiring block 42 is fitted and is secured, such as by threaded fasteners (one of which is indicated as fastener 53). The circuit/wiring block 42 is thereby advantageously disposed within the flow path 14 as well as being in thermal communication with the heat sinks 22 to ensure cooling of LED driver and other circuitry (not depicted) disposed therein.

Disposed within the reflector cavity 26 on the cavity side surface 30 is a LED device 56. The LED device 56 may be a single LED, an array of LED devices, a single die formed with multiple LED elements, or similar structures. The LED device 56 may emit light in the visible spectrum, the infrared spectrum, other spectrums visible or invisible and combinations thereof. The LED device 56 is in direct thermal contact with the cavity side surface 30, and hence to the heat sink 22. Heat from the LED device 56 is efficiently transferred from LED device 56 to the heat sink 22. From the cavity side surface 30, heat is communicated through the heat sink 22, which has low thermal resistance, to the fin side surface 32, which in operation is exposed to cooling medium passing through the flow path 14.

The heat sink 22 is formed with a via (not depicted) through which a wiring connection from the LED device 56 is made to the wiring/circuit block 42. The reflectors 20 formed with a depression 58 and the circuit/wiring block 42 is formed with an external wiring coupling surface 60 (FIG. 3) by which connections to external wiring may be made. The heat sinks 22 are further formed with a passage or via 64 through which a wiring connection is made from the third housing section 40, which may be an infrared housing section, to the circuit/wiring block 42.

In addition to heat sinks 22, the reflectors 20 may be constructed of low thermal resistance material, such as aluminum, aluminum alloys, thermally conductive polymers and the like. When so constructed, the reflectors 20, being exposed to the environment during use of the searchlight 10, also contribute to heat dissipation.

The cavity side surface 30 cooperates with a reflector surface 62 of the reflector 20 to optimize reflected light output of the searchlight 10. The reflector surface 62 may be made by polishing, providing a reflective coating and the like. Attaching the LED device 56 directly to the heat sink 22 eliminates the traditional circuit card to which LEDs are often attached. This allows more space within the reflector cavity 26 to be used for reflector area, i.e., the cavity side surface 30 and the reflector surface 62. Increasing the reflector area available to the LED device 56 improves illumination. Eliminating a circuit card or similar structure from within the reflector cavity 26 eliminates the thermal resistance offered by the circuit card to heat transfer from the LED device 56 to the heat sink 22. In addition to lowering the resistance to heat transfer by eliminating the circuit card, the flow path 14 allows for the heat sink 22 to be directly exposed to a flow of cooling medium so the LED device 56 can be cooled as efficiently as possible.

The searchlight 10 provides for directly exposing the reflector 20 and heat sink 22 to the environment. This is made possible by splitting the search light into at least the first housing portion 16 and the second housing portion 18. Splitting the searchlight 10 into multiple portions allows for the formation of air flow paths, allowing airflow to pass directly over the heat sink 22 where the greatest heat flux exists, and cooling the LED device 56 at an increased rate.

Embodiments described herein facilitate the use of high power LED device that will allow comparable illumination levels to existing searchlight constructions. Use of heat sinks and reflectors as heat sinks provide an increase in the mass of the heat sink capacity as well as increase in heat sink area.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A searchlight comprising:
   a first housing portion and a second housing portion, each of the first housing portion and the second housing portion comprising operably secured to form a reflector cavity: a heat sink, a reflector and a lens;
   the first housing portion and the second housing portion being joined to form a housing assembly, wherein the first housing portion heat sink and the second housing portion heat sink are disposed adjacent to one another and form a cooling medium flow path there between, such that heat sink elements of each heat sink thermally communicate with the flow path; and
   a first LED device directly thermally coupled to the heat sink within the first housing portion reflector cavity and a second LED device directly thermally coupled to the heat sink within the second housing portion reflector cavity;
   wherein a circuit/wiring block is disposed within the heat sink defined cooling medium flow path and mechanically joins the first housing portion heat sink and the second housing portion heat sink.

2. The searchlight of claim 1, wherein the heat sink elements extend into the flow path.

3. The searchlight of claim 1, wherein the circuit/wiring block is disposed between the first housing portion heat sink and the second housing portion heat sink within respective recesses formed in the first housing portion heat sink and the second housing portion heat sink.

4. The searchlight of claim 1, wherein the circuit/wiring block comprises an LED driver circuit and an electrical connector.

5. The searchlight of claim 1, comprising a third housing portion joining the first housing portion and the second housing portion.

6. The searchlight of claim 5, wherein the third housing portion comprises operably secured to form a third reflector cavity: a heat sink, a reflector and a lens, and a third LED device, wherein the third LED device is disposed within third reflector cavity.

7. The searchlight of claim 6, wherein the third LED device emits light in the infrared spectrum.

8. The searchlight of claim 1, wherein the first LED device emits light in the visible spectrum.

9. The searchlight of claim 1, wherein the second LED device emits light in the visible spectrum.

10. The searchlight of claim 1, wherein the reflectors are thermally conductive.

11. The searchlight of claim 1, wherein the first LED device is secured to a reflective surface of the heat sink.

12. The searchlight of claim 1, wherein the second LED device is secured to a reflective surface of the heat sink.

13. In a searchlight having a first housing portion and a second housing portion, each of the first housing portion and the second housing portion comprising operably secured to form a reflector cavity: a heat sink, a reflector and a lens, a method of cooling the searchlight comprising:
    mechanically securing together using a circuit/wiring block a first heat sink portion of the first housing portion and a second heat sink portion of the second housing portion to define a heat sink cooling medium flow path between the first heat sink portion and the second heat sink portion, the circuit/wiring block being disposed within the heat sink cooling medium flow path; and
    securing an LED device to the heat sink within each of respective reflector cavities.

14. The method of claim 13, wherein securing an LED device to the heat sink within each of respective reflector cavities comprises securing the LED device to a reflective surface of the heat sink.

15. The method of claim 13, wherein arranging the heat sinks to form a cooling medium flow path there between comprises providing the heat sinks with heat sink elements and disposing the heat sink elements within the flow path.

16. The method of claim 13, wherein arranging the heat sinks to form a cooling medium flow path there between comprises providing a circuit/wiring block disposed between the heat sinks and securing the heat sinks to the circuit/wiring block.

17. The method of claim 16, wherein providing a circuit/wiring block disposed between the heat sinks comprises disposing the circuit/wiring block within the flow path.

18. The method of claim 13, wherein arranging the heat sinks to form a cooling medium flow path there between comprises providing a third housing portion and securing the first housing portion and the second housing portion to the third housing portion.

* * * * *